US012632047B2

(12) United States Patent
Xu et al.

(10) Patent No.: US 12,632,047 B2
(45) Date of Patent: May 19, 2026

(54) ARTIFICIAL INTELLIGENCE DIAGNOSIS SYSTEM

(71) Applicants: Tyco Electronics (Shanghai) Co., Ltd., Shanghai (CN); TE Connectivity Services GmbH, Schaffhausen (CH)

(72) Inventors: Zhonghua Xu, Shanghai (CN); Dandan (Emily) Zhang, Shanghai (CN); Roberto Francisco-Yi Lu, Bellevue, WA (US); Rong Zhang, Shanghai (CN); Lei Wang, Taichung (TW); Chien-lin Chen, Taichung (TW)

(73) Assignees: TE Connectivity Services GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 535 days.

(21) Appl. No.: 18/150,293

(22) Filed: Jan. 5, 2023

(65) Prior Publication Data

US 2023/0221714 A1 Jul. 13, 2023

(30) Foreign Application Priority Data

Jan. 7, 2022 (CN) .......................... 202210015277.6

(51) Int. Cl.
G05B 23/02 (2006.01)
(52) U.S. Cl.
CPC ..... G05B 23/0243 (2013.01); G05B 23/0221 (2013.01)
(58) Field of Classification Search
None
See application file for complete search history.

(56) References Cited

U.S. PATENT DOCUMENTS 10,436,615 B2 * 10/2019 Agarwal ................ G01D 9/005
11,080,612 B2 * 8/2021 Hara ........................ G06N 7/01

OTHER PUBLICATIONS

Widhalm, Dominik, Karl M. Goeschka, and Wolfgang Kastner. "An open-source wireless sensor node platform with active node-level reliability for monitoring applications." Sensors 21.22 (2021): 7613. (Year: 2021).*
Xiao, Jin-Jun, et al. "Power scheduling of universal decentralized estimation in sensor networks." IEEE Transactions on Signal Processing 54.2 (2006): 413-422. (Year: 2006).*

* cited by examiner

*Primary Examiner* — Carlos R Ortiz Rodriguez
(74) *Attorney, Agent, or Firm* — Barley Snyder

(57) ABSTRACT

An artificial intelligence diagnosis system includes a diagnosis model responsive to data received from a plurality of sensors. Each of the sensors is a part of an input channel further including a converter operative to process the received sensor data. A system manager is provided and is operative with an allocator to selectively distribute sensor data to the converters. The system manager operates with the converters such that a converter which is allocated with the sensor data processes the allocated sensor data and inputs the processed sensor data into the artificial intelligence diagnosis model. A converter which is not allocated with the sensor data generates virtual sensor data according to an instruction of the allocator and inputs the virtual sensor data into the artificial intelligence diagnosis model.

20 Claims, 2 Drawing Sheets

ARTIFICIAL INTELLIGENCE DIAGNOSIS SYSTEM

CROSS-REFERENCE TO RELATED APPLICATIONS

This application claims the benefit of Chinese Patent Application No. CN202210015277.6 filed on Jan. 7, 2022 in the State Intellectual Property Office of China, the whole disclosure of which is incorporated herein by reference.

FIELD OF THE INVENTION

The present invention relates to an artificial intelligence diagnosis system.

BACKGROUND

Artificial intelligence (AI) diagnostic systems are usually used to diagnose the state of machine equipment. The artificial intelligence diagnosis system communicates with multiple sensors provided on the machine equipment. The sensors transmit various state parameter data of machine equipment, such as pressure, temperature, speed and other data, to the artificial intelligence diagnosis system. The artificial intelligence diagnosis system obtains the diagnosis results of machine equipment by processing and analyzing the received sensor data.

However, the AI module in the existing AI diagnostic system has a fixed number of data input channels, and each sensor corresponds to a data input channel. As a result, the number of the used sensors cannot be changed. If a sensor needs to be replaced, the AI diagnostic system is unable to continue to work.

SUMMARY

According to an embodiment of the present disclosure, an artificial intelligence diagnosis system includes a diagnosis model responsive to data received from a plurality of sensors. Each of the sensors forms part of an input channel further including a converter operative to process the received sensor data. A system manager is provided and is operative with an allocator to selectively distribute sensor data to the converters. The system manager operates with the converters such that a converter which is allocated with the sensor data processes the allocated sensor data and inputs the processed sensor data into the artificial intelligence diagnosis model. A converter which is not allocated with the sensor data generates virtual sensor data according to an instruction of the allocator and inputs the virtual sensor data into the artificial intelligence diagnosis model.

BRIEF DESCRIPTION OF THE DRAWINGS

The invention will now be described by way of example with reference to the accompanying Figures, of which.

DETAILED DESCRIPTION OF THE EMBODIMENTS

Figure 1:
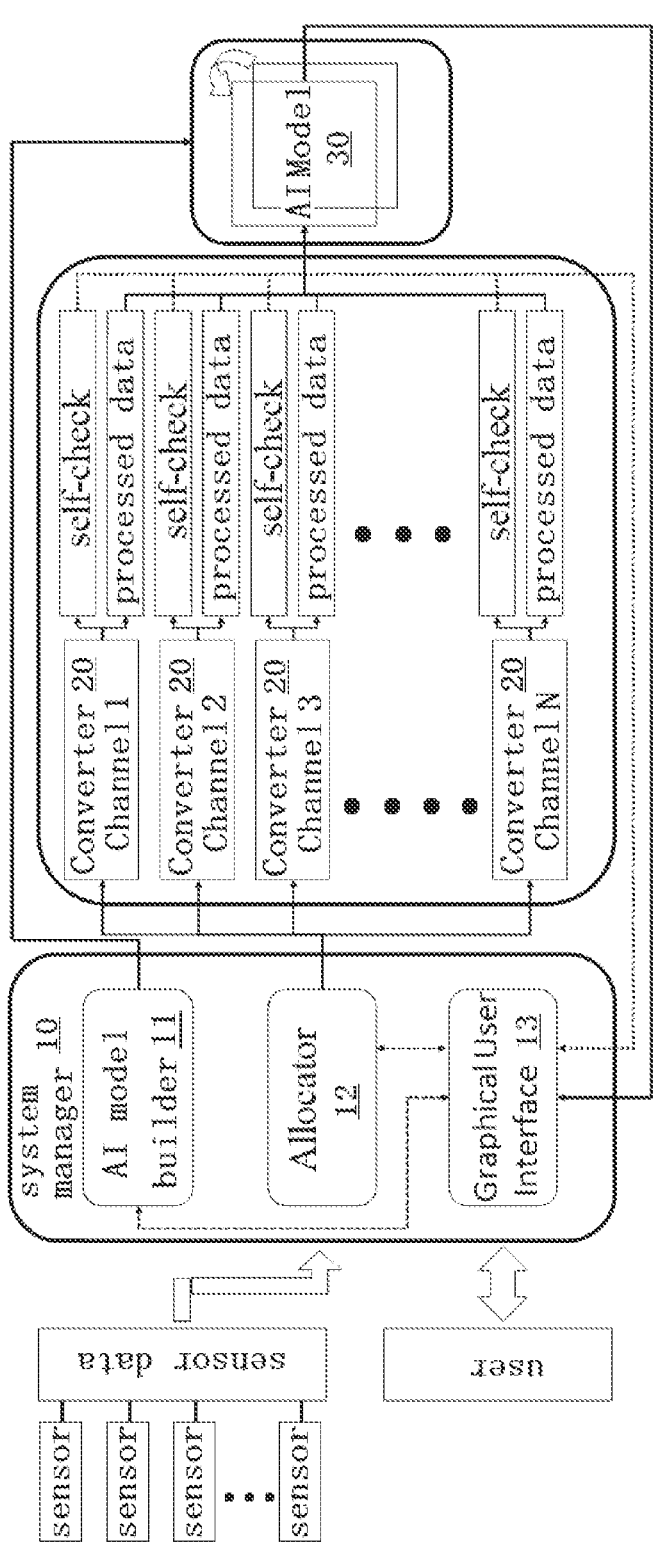
FIG. 1 shows a functional block diagram of an artificial intelligence diagnostic system according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, an artificial intelligence diagnosis system comprises an artificial intelligence diagnosis model, N data input channels, each of which has a converter, where N is an integer not less than 2, and a system manager which includes an allocator configured to allocate the received plurality of sensor data to the converters, respectively. The converter is adapted such that the converter which is allocated with the sensor data processes the allocated sensor data and inputs the processed sensor data into the artificial intelligence diagnosis model. The converter which is not allocated with the sensor data generates a virtual sensor data according to the instruction of the allocator and inputs the virtual sensor data into the artificial intelligence diagnosis model.

FIG. 1 shows a functional block diagram of an artificial intelligence diagnostic system according to an exemplary embodiment of the present invention. The AI diagnostic system includes: a system manager 10, an AI diagnostic model 30, and N data input channels are arranged between the system manager 10 and the AI diagnostic model 30, where N is an integer not less than 2. Each data input channel has a converter 20. The system manager 10 includes an allocator 12, which can distribute the received sensor data to the corresponding converter 20.

The converter 20 is configured such that:

(i) the converter 20 which is allocated with the sensor data processes the allocated sensor data and inputs the processed sensor data into the artificial intelligence diagnosis model 30; and (ii) the converter 20 which is not allocated with the sensor data generates a virtual sensor data according to the instruction of the allocator 12 and inputs the virtual sensor data into the artificial intelligence diagnosis model 30.

Therefore, according to embodiments of the present disclosure, if a sensor is disabled or removed, the converter 20 generates a virtual sensor data corresponding to the disabled or removed sensor to ensure that the AI diagnostic model 30 works normally.

The converter 20 includes a data processing device adapted to to normalize the received sensor data of different types. In this way, different types of sensor data can be recognized by the artificial intelligence diagnosis model 30. The converter 20 further includes a state checking device, adapted to judge whether the corresponding sensor itself is abnormal according to the received sensor data. The converter 20 is further adapted to generate a self-check result indicating whether the sensor itself is abnormal. For example, when the difference between the received sensor data and the normal sensor data exceeds a predetermined value, it can be determined that the sensor itself is abnormal.

The system manager 10 also includes a graphical user interface 13, enabling users to operate the system manager 10 therethrough. For example, the interface 13 enables a user to input operational instructions or parameters.

The converter 20 is adapted to feed back the generated self-check result indicating whether the sensor itself is abnormal to the graphical user interface 13. Thus, a user can monitor the status of the sensor itself. At the same time, the artificial intelligence diagnosis model 30 feeds back the generated diagnosis results to the graphical user interface 13, enabling the user to monitor the state of the detected object (e.g., a machine or other equipment) detected by the sensors.

In an exemplary embodiment of the present disclosure, the virtual sensor data generated by the converter 20 can be reasonably set according to the actual situation. For example, the virtual sensor data generated by the converter 20 can be set to the sensor data that the converter was allocated to last time or the average value of the sensor data that the converter was allocated to last ten times.

The system manager 10 further includes a diagnostic model builder 11, adapted to train the AI diagnostic model 30 using the changed sensor data to generate a new AI diagnostic model when the type and/or number of the used sensors is changed. In this way, an old AI diagnostic model 30 can be replaced by a new AI diagnostic model 30 to adapt to changes in the number and/or type of sensors.

Figure 2:
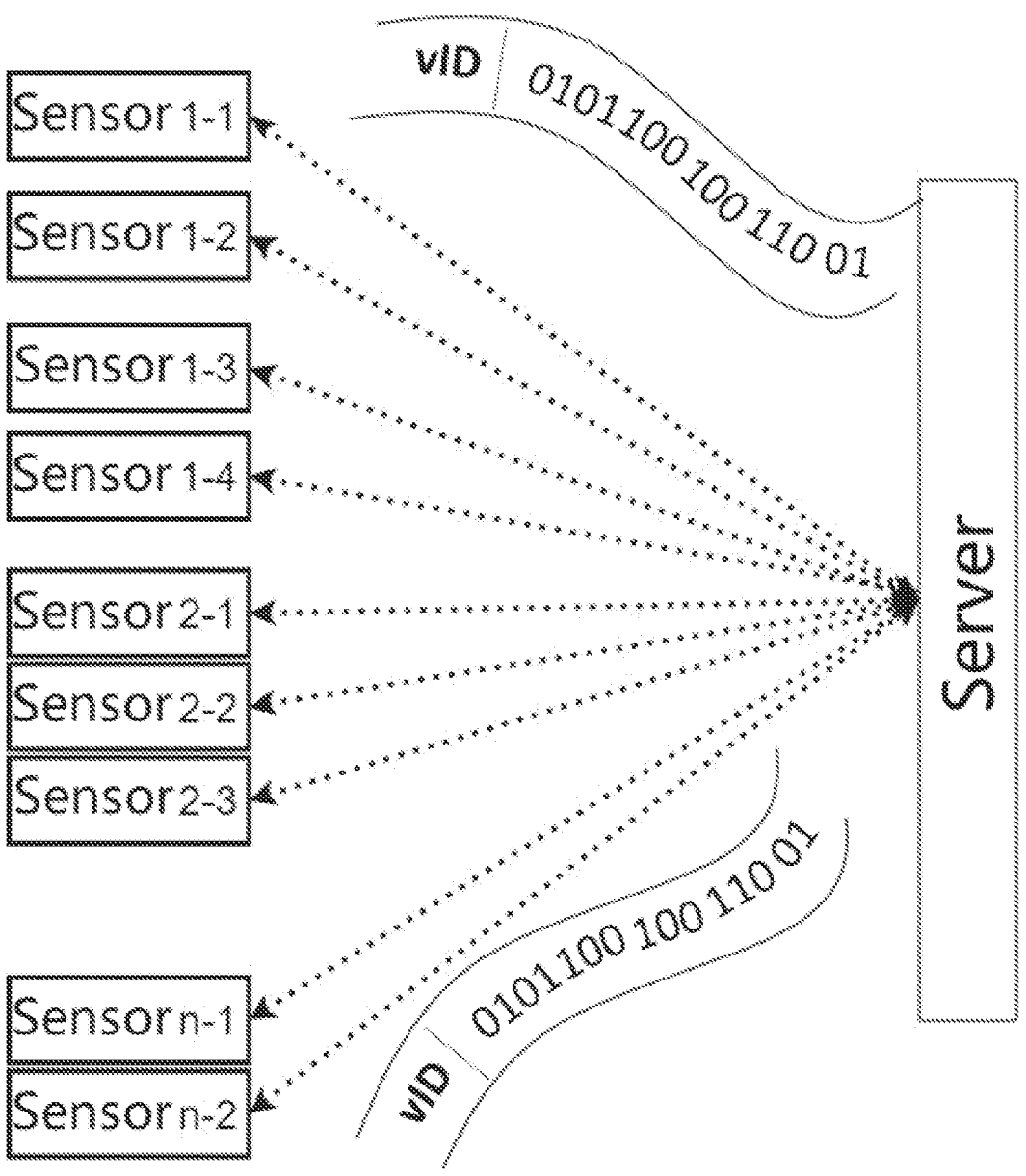
FIG. 2 shows a schematic diagram of a server running the artificial intelligence diagnosis system shown in FIG. 1 to identify multiple sensors.

FIG. 2 shows the schematic diagram of the server running the artificial intelligence diagnosis system shown in FIG. 1 to identify multiple sensors. As shown in FIGS. 1 and 2, the system manager 10, the converter 20 and the artificial intelligence diagnosis model 30 are functional modules composed of software and/or hardware running on the server. The sensors communicate with the server in a wired or wireless manner to transmit sensor data to the server.

As shown in FIG. 1 and FIG. 2, the allocator 12 also assigns a unique sensor identification data VID to each sensor. The sensor identification data VID and the corresponding sensor data are input into the corresponding data input channel together. In this way, the converter 20 and the artificial intelligence diagnosis model 30 are adapted to determine which sensor the received sensor data comes from based on the sensor identification data. For example, as shown in FIG. 2, the VIDs of the sensors are respectively set to 1-1, 1-2, 1-3, 1-4, 2-1, 2-2, 2-3, . . . , n-1, n-2. The sensor identification data VID and the corresponding sensor data are encoded into a data stream (i.e., an encoded data sequence), and are input into the corresponding data input channel in a data stream manner.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An artificial intelligence diagnosis system, comprising:
   an artificial intelligence diagnosis model receiving normalized sensor data and/or virtual sensor data and generating a diagnosis result;
   N sensors generating sensor data received by a corresponding plurality of N data input channels, each data input channel including a converter normalizing received sensor data, where N is an integer not less than 2; and
   a system manager which includes an allocator selectively distributing the sensor data to the converters, respectively, the system manager operating with the converters such that:
   a converter which is allocated with the sensor data processes the allocated sensor data and inputs the processed sensor data into the artificial intelligence diagnosis model; and
   a converter which is not allocated with the sensor data generates virtual sensor data corresponding to a disabled or removed sensor according to the instruction of the allocator and inputs the virtual sensor data into the artificial intelligence diagnosis model.

2. The artificial intelligence diagnosis system according to claim 1, wherein each converter includes a data processing device normalizing received sensor data of differing types such that different types of sensor data are recognized by the artificial intelligence diagnosis model.

3. The artificial intelligence diagnosis system according to claim 1, wherein each converter further includes a state checking device determining whether a corresponding sensor is abnormal according to the received sensor data and generating a self-check result indicating whether the sensor itself is abnormal.

4. The artificial intelligence diagnosis system according to claim 3, wherein the system manager further includes a graphical user interface enabling control of the system manager.

5. The artificial intelligence diagnosis system according to claim 4, wherein each converter feeds back the generated self-check result indicating whether the sensor itself is abnormal to the graphical user interface.

6. The artificial intelligence diagnosis system according to claim 5, wherein the artificial intelligence diagnosis model feeds back generated diagnosis results to the graphical user interface, the diagnosis results indicative of a state of an object detected by the sensors.

7. The artificial intelligence diagnosis system according to claim 1, wherein the virtual sensor data generated by the converter is set to the sensor data previously allocated to the converter.

8. The artificial intelligence diagnosis system according to claim 1, wherein the system manager further includes a diagnostic model builder adapted to, when a type and/or number of used sensors is changed, use the changed sensor data to train the artificial intelligence diagnostic model to generate a new artificial intelligence diagnostic model.

9. The artificial intelligence diagnosis system according to claim 1, wherein the allocator assigns a unique sensor identification data to each sensor, and inputs the sensor identification data and the corresponding sensor data into the corresponding data input channel.

10. The artificial intelligence diagnosis system according to claim 9, wherein each converter and the artificial intelligence diagnosis model determine from which sensor the received sensor data originates according to the sensor identification data.

11. The artificial intelligence diagnosis system according to claim 10, wherein the sensor identification data and the corresponding sensor data are encoded into a data stream and are input into the corresponding data input channel in a data stream manner.

12. The artificial intelligence diagnosis system according to claim 1, wherein the system manager, the converters and the artificial intelligence diagnosis model are functional modules running on a server.

13. An artificial intelligence diagnosis system, comprising:
  a plurality of input data channels adapted to receive data from a plurality of sensors;
  a plurality of converters, each converter associated with one of the input data channels and adapted to normalize received sensor data;
  an artificial intelligence diagnosis model receiving the normalized sensor data and/or virtual sensor data from each of the converters and generating a diagnosis result; and
  a system management processor operating with the converters to detect if the received sensor data is abnormal, wherein if abnormal sensor data from one of the input data channels is detected, the system management processor causes the converter associated with the abnormal sensor data to generate virtual sensor data corresponding to the abnormal sensor data provided to the artificial intelligence diagnosis model.

14. The artificial intelligence diagnosis system according to claim 13, wherein the system management processor further includes an allocator adapted to selectively provide received sensor data to one of the input data channels.

15. The artificial intelligence diagnosis system according to claim 13, wherein each converter includes a self-checking device adapted to output a self-check result if abnormal sensor data is detected.

16. The artificial intelligence diagnosis system according to claim 13, wherein the self-checking device detects the presence of abnormal sensor data if allocated sensor data exceeds a predetermined value.

17. The artificial intelligence diagnosis system according to claim 13, wherein the system management processor further includes a diagnostic model builder adapted to, when at least one of a type or a number of used sensors is changed, use the changed sensor data to train the artificial intelligence diagnostic model to generate a new artificial intelligence diagnostic model.

18. The artificial intelligence diagnosis system according to claim 13, further comprising a plurality of sensors operatively connected to a corresponding one of the input data channels.

19. The artificial intelligence diagnosis system of claim 18, wherein each of the plurality of sensors is of a different type.

20. The artificial intelligence diagnosis system of claim 13, wherein virtual sensor data is generated from existing stored sensor data.

\* \* \* \* \*